Aug. 5, 1952 E. TULLIS 2,606,255

TELEPHONE RECEIVER HOLDER

Filed Nov. 29, 1949

INVENTOR.

Ernest Tullis,

BY Victor J. Evans & Co.

ATTORNEYS

Patented Aug. 5, 1952

2,606,255

UNITED STATES PATENT OFFICE 2,606,255

TELEPHONE RECEIVER HOLDER

Ernest Tullis, Alamogordo, N. Mex., assignor of fifty per cent to Lester P. Burrow, Alamogordo, N. Mex.

Application November 29, 1949, Serial No. 129,954

1 Claim. (Cl. 179—156)

This invention relates to a telephone support, and more particularly to a device for supporting a telephone on the ear or head of the user.

The object of the invention is to provide a holder for comfortably and conveniently supporting a telephone receiver in a suitable position for both listening and speaking, whereby the user's hands are free to make notes, take messages, and the like.

Another object of the invention is to provide a telephone receiver holder which is adapted to be detachably attached to the user's ear and head, the holder being constructed so that the telephone receiver will be releasably supported therein so that both hands of the user are free to perform any desired function that may be necessary during the telephone conversation.

A further object of the invention is to provide a telephone receiver holder which is extremely simple and inexpensive to manufacture.

Other objects and advantages will be apparent during the course of the following description.

In the accompanying drawings, forming a part of this application, and in which like numerals are used to designate like parts throughout the same:

Figures 1, 2, 3, 4, 5, 6:
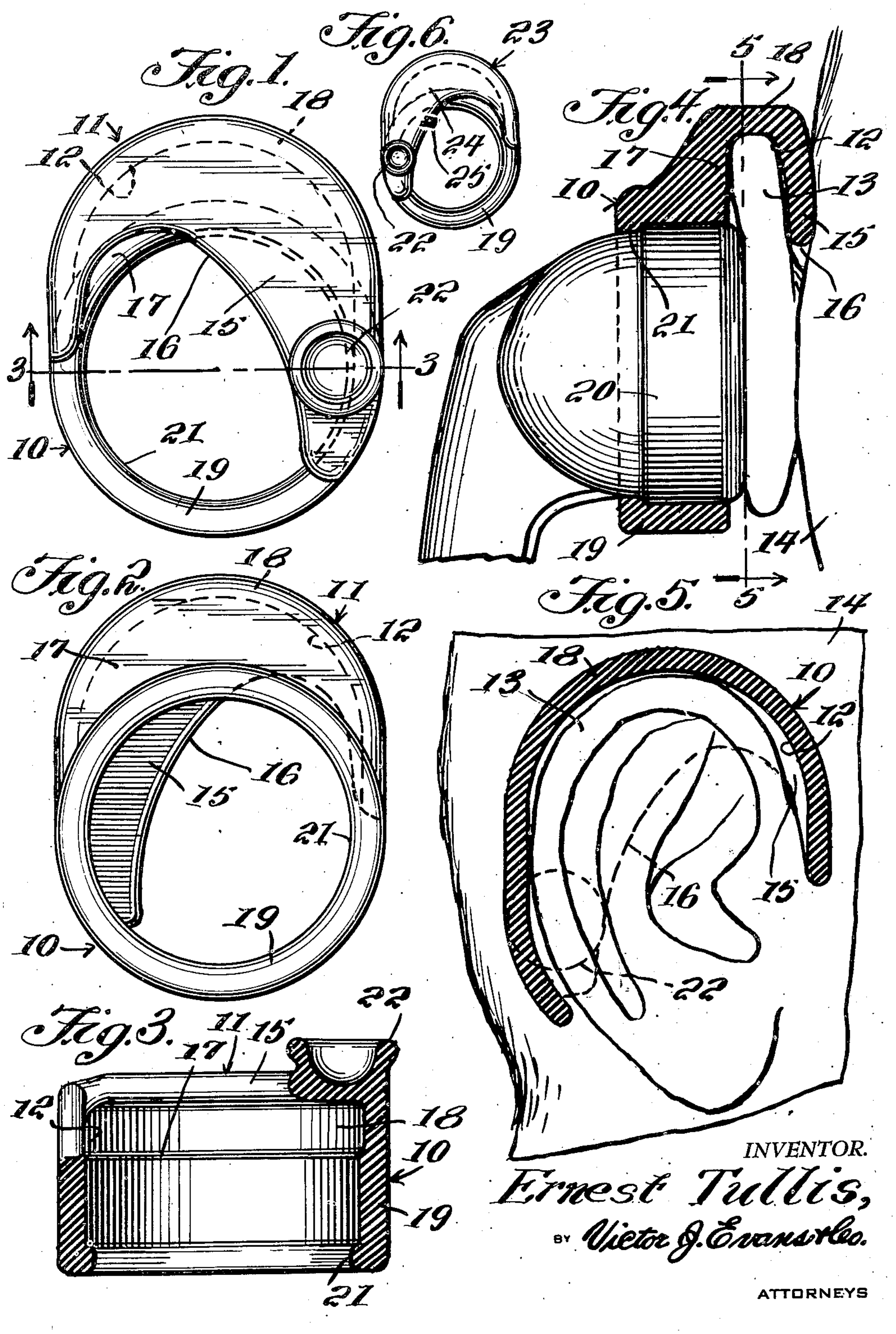
Figure 1 is a side elevational view of the telephone receiver holder, according to the present invention.
Figure 2 is a view looking at the opposite side of the holder of Figure 1.
Figure 3 is a sectional view taken on the line 3—3 of Figure 1.
Figure 4 is a view showing the use of the holder for supporting a telephone receiver, the holder being shown in section.
Figure 5 is a sectional view taken on the line 5—5 of Figure 4.
Figure 6 is a side elevational view of a modified holder for attachment to the left ear of the user.

Referring in detail to the drawings, the numeral 10 designates a holder for a telephone receiver, the holder being preferably fabricated of rubber. The holder 10 includes a body portion 11 that is provided with a recess 12 therein for receiving one of the user's ears 13, Figures 4 and 5.

The recess 12 is defined by an outer sidewall or flange 15 which is adapted to be interposed between the ear 13 and the head 14 of the user. The recess 12 is further defined by a wall or inner section 17, and an annular section 18 connects the inner section 17 and the outer section 15 together. The outer section 15 is cut away as at 16 so as to facilitate the placement of the holder 10 on the user's ear 13.

The holder of the present invention further includes an annular support member or ring 19 which is formed integral with the body member 11. The support member 19 has its end opened and the support member 19 is adapted to snugly receive therein the telephone receiver 20, Figure 4. The support member 19 is fabricated of flexible rubber whereby the receiver 20 can be readily inserted or positioned therein. An annular beam or flange 21 extends around the support member 19 for preventing the receiver 20 from accidentally working loose from the support member 19.

Formed integral with the lower portion of the outer section or flange 15 is a vacuum cup 22 which is adapted to be arranged in engagement with a portion of the user's head so as to insure that the holder 10 will not accidentally work loose or become dislodged from the user's head and ear during use.

In the holder shown in Figures 1 through 5, the outer section or flange 15 is cut away at 16 in order to facilitate the insertion of the user's right ear in the recess 12. In Figure 6, there is shown a holder which is indicated generally by the numeral 23, and the holder 23 is adapted to be arranged over the user's left ear instead of the right ear. The construction of the holder 23 is substantially the same as the construction of the holder 10, except that the holder 23 is provided with a side flange or section 24 that has a cut out 25 which extends in the opposite direction from the cut out 16.

From the foregoing, it is apparent that a holder has been provided whereby a telephone receiver 20 can be supported adjacent the user's ear in such a manner that the user's hands are free to take notes, write messages or perform other functions. The holder 10 is adapted to be arranged in engagement with the user's right ear 13, the holder including recess 12 for receiving therein the upper portion of the ear 13. Further, the holder is provided with a vacuum cup 22 which is adapted to be arranged in engagement with a portion of the user's head so as to prevent accidental dislodgement of the holder from the user's head. The support member 19 is flexible whereby the receiver 20 can be readily positioned therein, and the receiver 20 will be then arranged contiguous to the user's ear 13. The holder 10 is adapted to be positioned over the user's right ear, while the holder 23 of Figure 6 is adapted to be arranged over the user's left ear for supporting a telephone receiver.

What I claim:

As a new article of manufacture, a telephone receiver holder fabricated of rubber and comprising a body portion provided with a recess for receiving therein the user's ear, said body portion including a flange adapted to be interposed between the ear and head of the user, an annular open ended support member projecting from said body portion for receiving therein the telephone receiver, and annular bead arranged on the outer end of said support member for holding the receiver in said support member, and a vacuum cup formed integral with the support member on said body portion adjacent one end of said support member and adapted to be positioned in engagement with the side of the user's head for preventing accidental dislodgement of the holder from the user's head.

ERNEST TULLIS.

REFERENCES CITED

The following references are of record in the file of this patent:

UNITED STATES PATENTS

| Number | Name | Date |
|---|---|---|
| 281,000 | Batchelor | July 10, 1883 |
| 295,983 | Cook | Apr. 1, 1884 |
| 820,463 | Zimmerman | May 15, 1906 |

FOREIGN PATENTS

| Number | Country | Date |
|---|---|---|
| 13,885 | Great Britain | June 10, 1911 |